US007842362B2

(12) United States Patent
Kim et al.

(10) Patent No.: US 7,842,362 B2
(45) Date of Patent: Nov. 30, 2010

(54) WATER-RESISTANT WOUND PAPERBOARD TUBE

(75) Inventors: Tom T. H. Kim, Coquitlam (CA); Charles W. Lounsbury, Jr., Florence, SC (US); David E. Rhodes, Hartsville, SC (US); Garrett N. Smith, Hartsville, SC (US); Johannes Wim van de Camp, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 1323 days.

(21) Appl. No.: 11/357,231

(22) Filed: Feb. 17, 2006

(65) Prior Publication Data

US 2007/0196602 A1 Aug. 23, 2007

(51) Int. Cl.

*B29D 22/00* (2006.01)
*B29D 23/00* (2006.01)
*B32B 1/08* (2006.01)

(52) U.S. Cl. .................. 428/36.91; 428/34.1; 428/34.2; 428/34.3; 428/36.9; 428/343

(58) Field of Classification Search ................ 428/34.1, 428/34.2, 34.3, 36.9, 36.91, 343
See application file for complete search history.

(56) References Cited

U.S. PATENT DOCUMENTS

| | | | |
|---|---|---|---|
| 2,416,993 | A | 3/1942 | Grove |
| 3,837,279 | A | 9/1974 | Cooke, Jr. |
| 4,033,264 | A | 7/1977 | Bolza et al. |
| 4,085,074 | A | 4/1978 | Woo |
| 4,656,948 | A | 4/1987 | Tsukiuda et al. |
| 4,942,817 | A | 7/1990 | Ikeda et al. |
| 6,962,736 | B1 | 11/2005 | Haapaniemi et al. |
| 2005/0257878 | A1 | 11/2005 | Thomas et al. |

FOREIGN PATENT DOCUMENTS

| | | |
|---|---|---|
| EP | 1 002 731 | 5/2000 |
| GB | 1 471 436 | 4/1977 |
| WO | WO 97/07203 | 2/1997 |
| WO | WO 2004/041524 | 5/2004 |

OTHER PUBLICATIONS

The International Search Report for PCT Application No. PCT/US2007/062018; Filed Feb. 13, 2007; Date of Completion Sep. 14, 2007; Date of Mailing Oct. 2, 2007.

The Written Opinion for PCT Application No. PCT/US2007/062018; Filed Feb. 13, 2007; Date of Completion Sep. 14, 2007; Date of Mailing Oct. 2, 2007.

*Primary Examiner*—Michael C Miggins
(74) *Attorney, Agent, or Firm*—Alston & Bird LLP

(57) ABSTRACT

A wound paperboard tube having enhanced burst strength in high-moisture conditions up to and including complete and prolonged submersion in liquid water comprises a plurality of paperboard plies formed from a pulp comprising papermaking furnish and an effective amount of a size such that the paperboard plies have reduced moisture add-on when submerged in water, relative to paperboard plies formed from a pulp comprising the identical furnish but without the size. The plies are wound one upon another about an axis of the tube and adhered together with a water-resistant adhesive comprising a polyvinyl composition containing a cross-linking agent for inducing cross-linking of the adhesive.

11 Claims, No Drawings

WATER-RESISTANT WOUND PAPERBOARD TUBE

BACKGROUND OF THE INVENTION

The present invention relates to wound paperboard tubes used for various purposes including construction forms for pouring concrete columns, winding cores for rolls of sheet materials, container bodies, and blasting tubes for lining a hole to be filled with an explosive composition.

As indicated above, wound paperboard tubes are used for a wide variety of purposes. A chief advantage of paperboard tubes over alternative tube structures such as extruded plastic tubes, seamed metal tubes, or the like, is the relatively low cost of paperboard tubes. Paperboard tubes also have a relatively high strength to weight ratio, at least when the paperboard material is at normal moisture content levels of about 6 to 12 percent. However, when conventional paperboard tubes are exposed to significant amounts of moisture, the tubes can absorb a substantial amount of moisture, which greatly diminishes the strength of the tubes. The problem of moisture-induced degradation of paperboard tubes is most severe when the tube is fully submerged in or otherwise contacted by liquid water for an extended period of time. A conventionally made paperboard tube cannot withstand being fully submerged in water for any appreciable amount of time without losing integrity.

For these reasons, when a tube structure is needed for outdoor applications or other uses in which there is a likelihood that the tube will be exposed to rain or high moisture levels, conventional paperboard tubes are not selected.

In some cases, paperboard tubes have been treated to be water-resistant so that the tubes can tolerate at least some exposure to moisture. For example, it is known to coat outer surfaces of a paperboard tube with a water-resistant coating of resin or the like, or with a coating of nano-sized particles of inorganic material such as fumed silica. However, unless all surfaces are coated completely, immersion of the tube in water is likely to result in absorption of water. Such coating is also difficult to accomplish, particularly on the inner surface of the tube, and generally requires an additional coating operation after manufacture of the tube, thereby adding to the cost and complexity of tube formation. Further, surface coatings can be subject to damage, which can compromise the moisture barrier properties of the coating.

It is also known to form concrete column construction forms from wound paperboard tubes made with highly sized paperboard plies and conventional PVA adhesive. However, the adhesive is soluble in water and hence complete immersion of the tubes in water for extended periods can lead to disintegration of the tubes when the adhesive dissolves and the plies become detached from one another.

BRIEF SUMMARY OF THE INVENTION

The present invention addresses the above needs and achieves other advantages, by providing a wound paperboard tube capable of withstanding prolonged exposed to high-moisture conditions without completely losing structural integrity.

In accordance with one embodiment of the invention, a wound paperboard tube having enhanced burst strength in high-moisture conditions up to and including complete and prolonged submersion in liquid water comprises a plurality of paperboard plies formed from a pulp comprising papermaking furnish and an effective amount of a size such that the paperboard plies have reduced moisture add-on when submerged in water, relative to paperboard plies formed from a pulp comprising the identical furnish but without the size. The plies are wound one upon another about an axis of the tube and adhered together with adhesive comprising a polyvinyl composition containing a cross-linking agent for inducing cross-linking of the adhesive.

The size can comprise alkenyl succinic anhydride (ASA), or alkyl ketene dimer (AKD), or rosin-alum. The size preferably is present in an amount of about 1 to about 20 pounds per ton of dry weight of the pulp used to form the paperboard plies, although the amount of size also depends upon the particular size that is used. For instance, for ASA, an amount of about 10 to about 15 pounds per ton is advantageous, whereas for AKD an amount of about 6 to about 18 pounds per ton is useful. When rosin is employed, the rosin can be used in the amount of about 1 to about 8 pounds per ton, with sufficient alum added to yield a pH for the pulp of about 5.0 to about 6.0.

A paperboard tube in accordance with one embodiment of the invention, after full submersion in water for one hour at about 65° F. water temperature, has an internal burst strength normalized by wall thickness that is at least one-third of the normalized internal burst strength of the tube at equilibrium moisture content prior to submersion.

A paperboard tube in accordance with one embodiment of the invention, after full submersion in water for one hour at about 65° F. water temperature, has a moisture content less than about 40 percent, more preferably less than about 35 percent, and still more preferably less than about 30 percent.

A construction form for pouring concrete columns, in accordance with another embodiment of the invention, has a wall thickness to diameter ratio of about 0.0065 to about 0.02, and more preferably about 0.0065 to 0.015. The diameter can range from about 6 inches up to about 60 inches.

A winding core in accordance with a further embodiment of the invention comprises a plurality of paperboard plies formed from a pulp comprising papermaking furnish and an effective amount of a size such that the paperboard plies have reduced moisture add-on when submerged in water, relative to paperboard plies formed from a pulp comprising the identical furnish without the size, the plies being wound one upon another about an axis of the tube and adhered together with adhesive, the adhesive comprising a polyvinyl composition containing a cross-linking agent for inducing cross-linking of the adhesive.

In another embodiment of the invention, there is provided a blasting tube for lining an elongate hole drilled in rock or the like so that the hole can be filled with explosive charges for blasting. It is important to ensure that the hole stays open and clear of debris (e.g., caved-in material) until the explosive charge is loaded. Typically, a PVC pipe, or a spirally wound tube coated with a water-resistant coating, is used for lining the hole prior to inserting the explosive charge. In accordance with the invention, an alternative blasting tube is provided as a wound paperboard tube made from paperboard plies that are sized and are adhered together with adhesive containing a cross-linking agent for inducing cross-linking of the adhesive, as previously described. The blasting tube has a length to diameter ratio greater than about 30, and preferably greater than about 40. The tube preferably has a wall thickness to inside diameter ratio ranging from about 0.05 to about 0.10.

DETAILED DESCRIPTION OF THE INVENTION

The present inventions now will be described more fully hereinafter, in which some but not all embodiments of the inventions are described. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The objective of the present invention is to produce wound paperboard tubes that can withstand being fully submerged in water for at least 12 hours without disintegrating. In some applications, such conditions may approximate the actual conditions likely to be experienced by the paperboard tube during use. For example, in conducting blasting operations with explosives, typically a long hole is drilled through the rock or other ground formation that is to be blasted, and then the hole is lined to prevent it from caving in, by inserting a long tube into the hole. The tube lining allows explosive charges to be loaded into the hole without being impeded by debris that otherwise could fall into the hole, such as by the wall of the hole caving in. In some cases, a significant length of time may pass between the time the hole is lined and the time the explosive charges are loaded. During such time, rain or ground water can fill the hole. Thus, the tube lining can be fully submerged, as least over a lower portion of its length, if not its full length, for a substantial period of time. It is important for the tube to have sufficient structural strength and integrity to stay in the shape of a tube, despite being submerged in water. A conventionally made paperboard tube cannot withstand being submerged in water for extended periods, as previously noted. In blasting operations, it is conventional to line the hole with a PVC pipe or a paper tube coating with a water-resistant coating. However, PVC pipe is relatively expensive, and the water-resistant coating on paper tubes can easily be damaged so that the tube loses much or all of its water resistance and thus loses integrity in high-moisture conditions.

In other applications of paperboard tubes, complete submersion in water may not be likely, but the tubes can nevertheless be exposed to significant moisture. For example, concrete construction forms and/or winding cores are often formed of paperboard tubes, and it is not uncommon for the tubes to be left outdoors for periods of time. In the case of winding cores for agricultural film, for instance, the rolls of film may often be left outdoors prior to being used, where they may be rained on. Furthermore, concrete construction forms may absorb water from the wet concrete poured into them.

Paper strength properties are reduced as the moisture content of the paper increases. If conventional paperboard tubes are submerged in water for an hour or more, typically the moisture content of the tubes will increase to a high level of 40%, 50%, 60%, or even more, as the paperboard material absorbs water. Additionally, the adhesive used for joining the plies typically is a water-based adhesive that softens and dissolves when soaked with water, and hence the plies of the tube usually detach from one another when the tube is submerged in water for an hour or more. Consequently, the tube can lose all structural integrity and fall apart.

In accordance with the invention, a paperboard tube is constructed of paperboard plies that are highly sized such that the plies have a significantly reduced tendency to absorb water compared to paperboard plies that are not highly sized but otherwise identical. Additionally, the paperboard plies are adhered to one another using a water-resistant adhesive. The adhesive comprises a polyvinyl adhesive having a cross-linking agent for inducing cross-linking of the adhesive.

The paperboard plies in accordance with the invention are formed in a generally conventional fashion in a paperboard-making machine wherein an aqueous pulp is formed by mixing papermaking furnish with water and optionally various additives, the pulp is formed into a wet web in a forming section of the machine, the wet web is pressed in one or more presses to remove water, and the web is thermally dried to remove substantially all of the remaining water (i.e., typically dried to a moisture content of about 4 to 8 percent). In accordance with the invention, the paperboard is "internally sized" by adding a size to the pulp used for forming the wet web in the forming section. The size can comprise various compositions including but not limited to alkenyl succinic anhydride (ASA), alkyl ketene dimer (AKD), or a rosin and alum sizing.

Example Pulp:

As an example, a suitable pulp can be formed by repulping about 75% by weight OCC (old corrugated cardboard) and about 25% by weight paperboard tube scrap to form an aqueous pulp. About 1.7 pounds of a flocculent are added per ton of dry weight of pulp, and about 1.5 pounds of a coagulant are added per ton of dry weight of pulp. About 10.5 pounds of ASA size are added per ton of dry weight. The pulp is beaten in conventional fashion and then diluted to a consistency of about 1% to 2% before being injected onto the forming wire (s) in the forming section of the machine.

The flocculent and coagulant promote drainage of water and retention of fines and size during web formation in the forming section of the machine. Other additives optionally can be included along with the size to enhance the water holdout characteristics of the finished paperboard.

Example Tube Constructions:

Paperboard was made from the above-described Example Pulp, having a caliper of 0.025 inch (25 points); the paperboard is referred to herein as "WR" (water-resistant) board. Spirally wound paperboard tubes were constructed from the WR plies, using 9C224-04 liquid water-based PVA adhesive available from the Adhesives Division of Sonoco Products Company of Hartsville, S.C. The tubes had an inside diameter of 16 inches and a wall thickness of about 0.108 inch (108 points); the tubes are referred to herein as "WR tubes". The WR tubes were cut into 10-inch long sections.

As a control for comparison purposes, paperboard tubes of similar (but not identical) dimensions were constructed from 25-point paperboard made from substantially the same furnish formulation as the WR paperboard, but without the size; these tubes are referred to herein as "standard tubes". The standard tubes had an inside diameter of 16 inches and a wall thickness of about 0.161 inch (161 points). The standard tubes were cut into 10-inch long sections.

Prior to testing, the moisture content of all of the tubes was determined by weighing a number of samples of each tube type and then oven-drying the samples to a bone-dry condition and reweighing the samples; the moisture content was determined based on the change in weight. One batch each of the WR tubes and the standard tubes were then fully submerged in water at approximately 65° F. for a period of one hour, while another batch each of WR tubes and standard tubes were submerged for a period of four hours. After the desired soaking period in each case, the tubes were removed from the water and allowed to drain for one minute, the bottom ends of the tubes were blotted on cardboard, and the tubes then were weighed to enable determination of the amount of moisture add-on for each tube.

The tubes were then immediately subjected to an internal burst test using a burst testing apparatus. The apparatus consisted of an annular rubber bladder mounted about a steel cylinder. The outside diameter of the bladder in a relatively unpressurized condition was selected to be slightly less than 16 inches to enable a tube sample to be sleeved over the bladder. The bladder's length was about 18 inches, and each of the samples was mounted about the axial midpoint of the bladder, such that each end of the bladder projected beyond the end of the sample by about 4 inches. Each of the end portions of the bladder was surrounded by a ⅛-inch thick flexible band and an aluminum ring mounted concentrically about the flexible band to substantially constrain the end portions of the bladder from expanding. The bladder was then slowly pressurized with water until the sample burst. The highest pressure of the water was recorded as the burst pressure in each case. Burst testing was also done on WR and standard tubes in a dry condition (i.e., at equilibrium moisture content after holding the samples in the same environment). The results of the testing are shown in Table I below:

TABLE I

| Tube Type - Time Submerged | Water Temp ° F. | Normalized Burst Strength, psi/point (% of Dry) | Original Moisture Content | Sub-merged Moisture Content | Percent Mois-ture Add-On |
|---|---|---|---|---|---|
| WR (108 pt.) | | | | | |
| Dry | N/A | 0.883 (100%) | 6.7% | N/A | N/A |
| 1 Hour | 64 | 0.362 (41.0%) | 7.4% | 26.6% | 19.2% |
| 4 Hours | 64 | 0.298 (36.6%) | 7.4% | 37.7% | 30.2% |
| Standard (161 pt.) | | | | | |
| Dry | N/A | 0.795 (100%) | 5.2% | N/A | N/A |
| 1 Hour | 66 | 0.215 (27.0%) | 6.5% | 49.0% | 42.5% |
| 4 Hours | 65 | 0.207 (26.1%) | 7.8% | 59.6% | 51.8% |

The burst strength of each tube was normalized by the wall thickness (expressed in psi per point of thickness) to better enable comparison between the WR and standard tubes on an absolute as well as relative basis. The burst strengths in Table I are also expressed as a percentage of the burst strength of the dry tubes in each case. The data in Table I indicate a significant improvement in retention of burst strength of the WR tubes after submersion, compared to the standard tubes. After submersion for one hour, the WR tubes still had 41 percent of their dry burst strength, while the standard tubes had only 27 percent of the dry burst strength. Furthermore, after one hour, the WR tubes gained only 19.2 percent moisture, compared to 42.5 percent moisture for the standard tubes.

After submersion for four hours, the WR tubes had 36.6 percent of their dry burst strength and gained 30.2 percent moisture. In contrast, the standard tubes had only 26.1 percent of their dry burst strength and gained 51.8 percent moisture.

It can also be seen in Table I that the WR tubes in a dry state had a higher normalized burst strength than the standard tubes (0.883 psi/point, compared to 0.795 psi/point). The invention thus enables paperboard tubes to be made with thinner walls than standard tubes while achieving comparable burst strength particularly after submersion in water, in view of the better retention of burst strength achieved by the WR tubes. Accordingly, paperboard tubes made in accordance with the invention, for a given application, can be lighter in weight and potentially lower in cost than standard tubes.

As noted, the invention is applicable to a number of different paperboard tube applications. As one example, a winding core in accordance with the invention can comprise a paperboard tube formed by winding paperboard plies that are internally sized as previously described, the plies being adhered together with water-resistant adhesive comprising polyvinyl composition with a cross-linking agent for inducing cross-linking of the adhesive. A suitable adhesive, as one non-limiting example, is 9C224-04 liquid water-based PVA adhesive available from the Adhesives Division of Sonoco Products Company of Hartsville, S.C. Alternatively, other water-resistant adhesives could be used instead.

Winding cores in accordance with the invention can have an inside diameter ranging from about 2 inches up to about 60 inches, and a wall thickness to inside diameter ratio ranging from about 0.002 to about 0.2, depending on the specific strength and dimensional requirements in each case.

The invention is also applicable to concrete construction forms. As one example, a construction form in accordance with the invention can comprise a paperboard tube formed by winding paperboard plies that are internally sized as previously described, the plies being adhered together with water-resistant adhesive comprising a polyvinyl composition with a cross-linking agent for inducing cross-linking of the adhesive. A suitable adhesive, as one non-limiting example, is 9C224-04 liquid water-based PVA adhesive available from the Adhesives Division of Sonoco Products Company of Hartsville, S.C. Alternatively, other water-resistant adhesives could be used instead, as previously noted.

Construction forms in accordance with the invention can have an inside diameter ranging from about 6 inches to about 60 inches. The forms can have a wall thickness to inside diameter ratio ranging from about 0.0065 to about 0.02, and more preferably about 0.0065 to about 0.015.

The invention is also applicable to blasting tubes for lining a drilled hole into which explosive charges are to be loaded. As one example, a blasting tube in accordance with the invention can comprise a paperboard tube formed by winding paperboard plies that are internally sized as previously described, the plies being adhered together with water-resistant adhesive comprising a polyvinyl composition with a cross-linking agent for inducing cross-linking of the adhesive. A suitable adhesive, as one non-limiting example, is 9C224-04 liquid water-based PVA adhesive available from the Adhesives Division of Sonoco Products Company of Hartsville, S.C. Alternatively, other water-resistant adhesives could be used instead, as previously noted.

Blasting tubes in accordance with the invention can have an inside diameter ranging from about 2 inches to about 4 inches, and a wall thickness to inside diameter ratio ranging from about 0.05 to about 0.10. The blasting tubes generally are produced in relatively long lengths, having a length to diameter ratio of at least about 30, and more preferably at least about 40.

Many modifications and other embodiments of the invention will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A wound paperboard tube for use in high-moisture conditions up to and including complete and prolonged submersion in liquid water, the tube comprising:

a plurality of paperboard plies formed from a pulp comprising papermaking furnish and an effective amount of a size such that the paperboard plies have reduced moisture add-on when submerged in water, relative to paperboard plies formed from a pulp comprising the identical furnish without the size, the plies being wound one upon another about an axis of the tube and adhered together with adhesive;

the adhesive comprising a polyvinyl composition containing a cross-linking agent for inducing cross-linking of the adhesive.

2. The wound paperboard tube of claim 1, wherein the size comprises alkenyl succinic anhydride.

3. The wound paperboard tube of claim 1, wherein the size comprises alkyl ketene dimer.

4. The wound paperboard tube of claim 1, wherein the size comprises rosin-alum.

5. The wound paperboard tube of claim 1, wherein the size is present in the pulp in the amount of about 1 to about 20 pounds per ton of dry weight of the pulp.

6. The wound paperboard tube of claim 1, wherein the tube after full submersion in water for one hour at about 65° F. water temperature has an internal burst strength normalized by wall thickness that is at least one-third of the normalized internal burst strength of the tube at ambient moisture content prior to submersion.

7. The wound paperboard tube of claim 1, wherein the tube after full submersion in water for one hour at about 65° F. water temperature has a moisture content less than about 40 percent.

8. The wound paperboard tube of claim 1, wherein the tube after full submersion in water for one hour at about 65° F. water temperature has a moisture content less than about 35 percent.

9. The wound paperboard tube of claim 1, wherein the tube after full submersion in water for one hour at about 65° F. water temperature has a moisture content less than about 30 percent.

10. The wound paperboard tube of claim 1, wherein the tube after full submersion in water for one hour at about 65° F. water temperature has a moisture content less than about 40 percent and an internal burst strength normalized by wall thickness that is at least one-third of the normalized internal burst strength of the tube at ambient moisture content prior to submersion.

11. The wound paperboard tube of claim 1, wherein the tube has a wall thickness to inside diameter ratio of about 0.0065 to about 0.02.

* * * * *